June 30, 1959  R. F. LO PRESTI ET AL  2,892,533
TROUGHING ROLLER ASSEMBLY FOR BELT CONVEYORS
Filed March 13, 1957  2 Sheets-Sheet 2

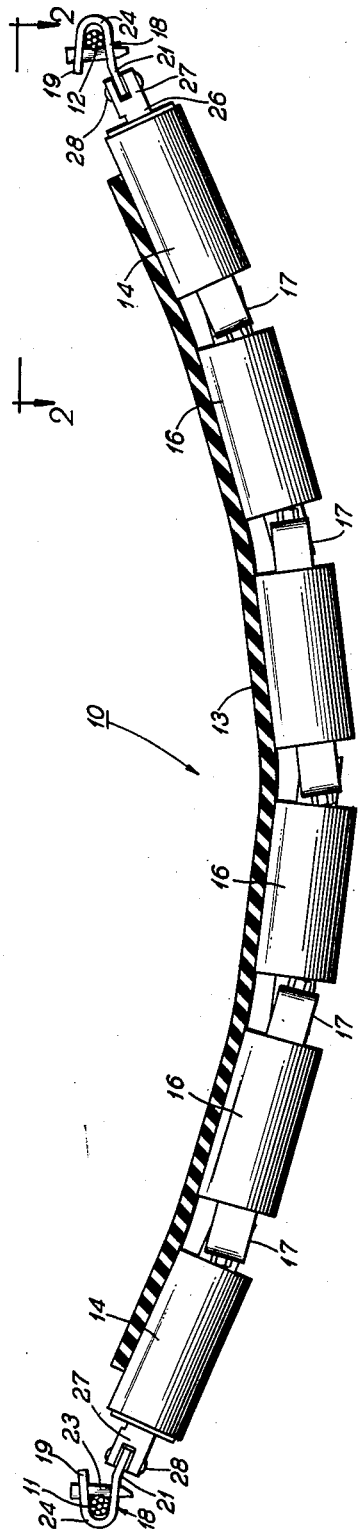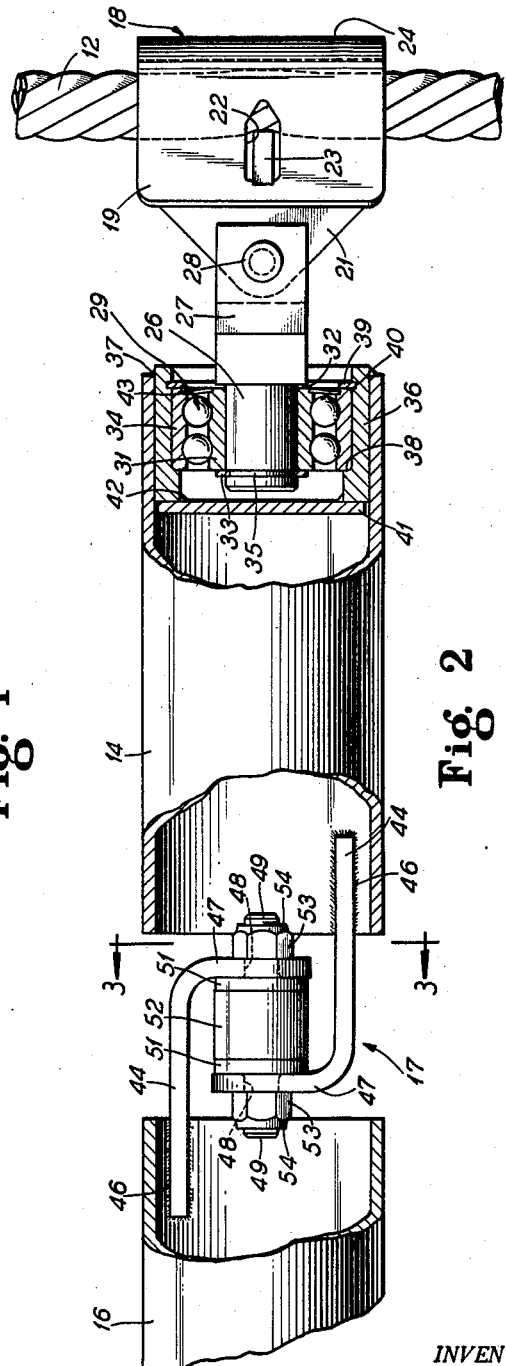

INVENTOR.
Roy F. LoPresti
BY Herman E. Smith
ATTORNEY

United States Patent Office 2,892,533
Patented June 30, 1959

2,892,533

TROUGHING ROLLER ASSEMBLY FOR BELT CONVEYORS

Roy F. Lo Presti, Chicago, and Herman E. Smith, Park Forest, Ill., assignors to Goodman Manufacturing Company, Chicago, Ill., a corporation of Illinois Application March 13, 1957, Serial No. 645,718

4 Claims. (Cl. 198—192)

This invention relates generally to improvements in belt conveyors, and more particularly to an improved troughing roller assembly therefor.

In more recent developments in endless belt conveyors the conveying reach of the belt is supported on troughing assemblies having load carrying rollers which move relatively to each other in accordance with the loading condition. Such assemblies have been characterized by long rollers mounted on dead shafts articulately connected, or by disk type rollers molded to a flexible cable having its ends mounted in a pair of bearings, so that the rollers turn as a unit with the flexible cable. In the former type of assembly each roller has a pair of bearings so that the roller can freely turn on its dead shaft, making the assembly rather costly. In the latter type the entire assembly is open to the objection of revolving as a unit about its end bearings with what may be called a "jump rope" action.

One of the principal objects of this invention is to provide a troughing roller assembly characterized by the need of only a single pair of supporting bearings, but still employing long rollers articulately connected in a manner as to eliminate the need for dead shafting and bearings for mounting the individual rollers.

Another object is to provide an improved means for interconnecting long rollers for articulating movement in both horizontal and vertical planes to make it unnecessary to mount each roller upon its own shaft.

Other objects and important features of the invention will be apparent from a study of the specification following taken with the drawings which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

Fig. 1 is an elevational view of a troughing roller assembly having the improvements according to the present invention embodied therein;

Fig. 2 is a detailed plan view to a larger scale than that seen in Fig. 1, certain parts being shown in section, of a portion of the troughing roller assembly seen in Fig. 1;

Figure 3:
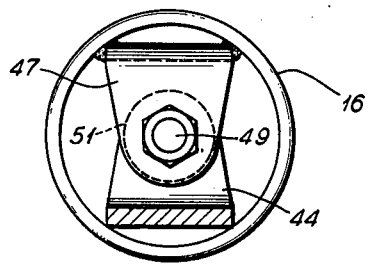
Figure 4:
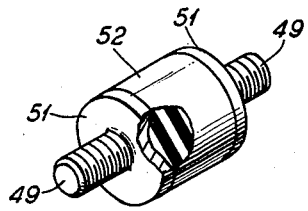

Fig. 3 is an end view of a connection between adjacent rollers of the assembly seen in Figs. 1 and 2, said view being in the direction of the arrows 3—3 of Fig. 2; and Fig. 4 is a perspective view of a connecting device for the adjacent rollers of the assembly seen in Figs. 1 and 2.

Referring now to Fig. 1 of the drawings, the troughing assembly according to the present invention is indicated generally by the reference numeral 10 and is designed to extend between laterally spaced flexible strands or cables 11 and 12 for the support of the conveying reach 13 of an endless belt conveyor. The troughing assembly 10 consists of a pair of end rollers 14, 14 which are articulately interconnected with intermediate rollers 16 by means of a connecting device or means referred to generally by the reference numeral 17.

Each of the end rollers 14 is arranged to be supported from the flexible strand 12 by means of a mounting bracket 18 having an upper limb 19 and a lower limb 21, each of the limbs 19 and 21 having aligned apertures 22 to receive a clamping drift pin or spike 23 which firmly wedges the cable or strand 11 or 12 into a bight 24 connecting the upper limb 19 to the lower limb 21.

The articulately interconnected rollers 14, 16 are arranged to revolve as a unit upon a stub shaft 26 having its outer end terminating in a clevis 27 embracing the lower limb 21, and pivotally connected to the lower limb 21 by means of a pin 28 passing through the clevis 27 and the lower limb 21.

Each of the interconnected rollers 14 and 16 is in the form of a hollow tube, as shown, and each roller 14 is arranged to turn freely on the stub shaft 26, there being a thrust type ball bearing 29 interposed between the roller 14 and the stub shaft 26. Bearing 29 has an inner race 31 held in position between a shoulder 32 on the stub shaft 26 and a C-clamping ring 33 maintained in a groove 35 on the inner end of shaft 26. The bearing 29 also has an outer race 34 held in a bearing support 36 welded as at 37 to the hollow roller 14, and between a shoulder 38 formed in such support 36 and a C-type clamping ring 39 maintained in a groove 40 formed in support 36. A circular plate 41 is welded at 42 to the inside end of the bearing support 36 and a ring type dust seal 43 spanning the distance between inner race 31 and the outer race 34 preventing the entrance of dirt or other foreign material to the bearing 29.

Referring now also to Figs. 3 and 4 of the drawings, the several rollers are interconnected for articulating movement in both vertical and horizontal planes by the connecting device or means 17. Each of the rollers is connected to the connecting means 17 by a one-half bail 44 which is welded at 46 to the inside face of the hollow tube roller 16. Each half bail 44 is substantially in the shape of an L and has a leg 47 which is drilled at 48 to fit over a stud 49 extending from a circular disk 51 bonded to a cylindrical shaped rubber or other elastomer member 52. As seen in Fig. 2 each of the legs 47 is held against its adjacent washer 51 by means of a nut 53 threaded to the stud 49 and locked in position by a lock washer 54.

It will be observed that the rubber member 52 is at all times maintained in compression by any load on the contiguous rollers 16, 16 or 16, 14, and that the rubber member 52 can connect any two contiguous rollers for articulating movement therebetween. The connecting means 17 thus will enable the contiguous roller 16, 16 to adopt the position as seen in Fig. 1 or similar positions in accordance with the loading on the conveying reach 13.

While the invention has been described in terms of a preferred embodiment thereof its scope is intended to be limited only by the claims here appended.

We claim as our invention:

1. A troughing assembly for supporting a reach of an endless belt conveyor comprising a plurality of elongated rollers, means for connecting each end of said troughing assembly to a support, bearing means supported on said means for rotatably supporting an end roller of said assembly, and means for interconnecting the rollers of said troughing assembly for rotation together while enabling movement thereof in generally horizontal and vertical planes comprising a half bail extending from the contiguous ends of adjacent rollers, and a connector member between said half bails comprising an elastomer having a disk bonded at each end thereof, and means for connecting each half bail to the disk so as to maintain said elastomer in compression.

2. A troughing assembly comprising a plurality of elongated rollers, bearing means for rotatably connecting each end portion of the troughing assembly to a support, and connecting means for interconnecting the rollers of said troughing assembly for rotation together while enabling movement thereof in generally horizontal and vertical planes, said connecting means including portions extending from the contiguous ends of adjacent rollers, a connector elastomer member disposed intermediate the portions, and means for connecting the portions together, said means having a part thereof interposed between the elastomer member and the portions for maintaining the elastomer member in compression.

3. A troughing assembly for supporting a reach of an endless belt conveyor comprising a plurality of elongated rollers, bearing means for rotatably connecting each end portion of the troughing assembly to a support, a connecting device for interconnecting the rollers of said troughing assembly for rotation together while enabling movement thereof in generally horizontal and vertical planes, said connecting device including a half-bail extending from the contiguous ends of each adjacent roller, a connector elastomer member intermediate the half-bails and means for connecting the half-bails together, said means having a part thereof interposed between the elastomer member and each half-bail for maintaining the elastomer member in compression.

4. A troughing assembly comprising a plurality of elongated rollers, means for rotatably connecting each end portion of the troughing assembly to a support, and connecting means for interconnecting the rollers for rotation together while enabling articulating movement thereof, said connecting means including means extending from the contiguous ends of adjacent rollers, an elastomer member disposed intermediate the extending means, and means for connecting the extending means together, said last named means having a part thereof interposed between the elastomer member and the extending means for maintaining the elastomer member in compression.

References Cited in the file of this patent

UNITED STATES PATENTS

| | | |
|---|---|---|
| 2,262,325 | Kendall | Nov. 11, 1941 |
| 2,592,831 | Spurgeon et al. | Apr. 15, 1952 |

FOREIGN PATENTS

| | | |
|---|---|---|
| 890,337 | France | Nov. 2, 1943 |